US006094500A

United States Patent [19]

Ross et al.

[11] Patent Number: 6,094,500

[45] Date of Patent: Jul. 25, 2000

[54] APPARATUS FOR AUTHENTICATING SHEETS

[75] Inventors: Gary A. Ross, Fife; Philip J. Heelan, Dundee, both of United Kingdom

[73] Assignee: NCR Corporation, Md.

[21] Appl. No.: 09/022,804

[22] Filed: Feb. 13, 1998

[30] Foreign Application Priority Data

May 24, 1997 [GB] United Kingdom .................. 9710717

[51] Int. Cl.[7] .................................................. G06K 9/00

[52] U.S. Cl. ........................................ 382/135; 356/71

[58] Field of Search ................................ 382/135, 100, 382/137, 138, 140; 356/71; 235/379; 209/534; 902/7; 250/200

[56] References Cited

U.S. PATENT DOCUMENTS

| | | | |
|---|---|---|---|
| 3,573,472 | 4/1971 | Madalo | 250/219 |
| 3,774,046 | 11/1973 | Hoch et al. | 250/485 |
| 4,296,326 | 10/1981 | Haslop et al. | 250/372 |
| 4,435,834 | 3/1984 | Pauli et al. | 382/7 |
| 4,558,224 | 12/1985 | Gober | 250/461.1 |
| 4,756,557 | 7/1988 | Kaule et al. | 283/85 |
| 5,592,561 | 1/1997 | Moore | 382/103 |
| 5,607,040 | 3/1997 | Mathurin, Sr. | 194/207 |
| 5,912,982 | 6/1999 | Munro et al. | 382/135 |
| 5,918,960 | 7/1999 | Hopwood et al. | 350/71 |

FOREIGN PATENT DOCUMENTS

| | | | |
|---|---|---|---|
| 9519019 | 7/1995 | WIPO | G07D 7/00 |
| 9610800 | 4/1996 | WIPO | G06K 9/00 |

*Primary Examiner*—Andrew W. Johns
*Assistant Examiner*—Shervin Nakhjavan
*Attorney, Agent, or Firm*—Francis L. Conte

[57] ABSTRACT

A self-service deposit terminal (10) is arranged to authenticate bank notes by exposing them to ultra-violet (UV) light which causes forged notes comprising wood-based paper to fluoresce. Each note (36) is individually transported between a UV light tube (38) and a first photo-diode (40). The level of light emitted by the UV light tube is monitored by a second photo-diode (52). The amplified output of this second photo-diode acts as a threshold value. The amplified outputs of both photo-diodes are applied to a Schmitt trigger (60) which outputs a high signal if the tested note is judged to fluoresce and a low signal if it does not. The output of the Schmitt trigger (60) is applied to a data processing means (24) which determines either solely on this output, or in conjunction with the output from other validation means, whether the tested note is genuine or not.

20 Claims, 3 Drawing Sheets

APPARATUS FOR AUTHENTICATING SHEETS

BACKGROUND OF THE INVENTION

The present invention relates to an apparatus for authenticating sheets such as bank notes.

Bank notes have many features that make it difficult to forge them. However, forgers can now recreate many of these features such as threads and watermarks. It is known that genuine bank notes comprise linen-based paper whereas forged bank notes generally comprise wood-based paper.

Validation is a problem in self-service deposit terminals where there is no human interaction to check for forgeries.

SUMMARY OF THE INVENTION

It is an object of the present invention to provide an improved apparatus for authenticating printed sheets.

According to the present invention there is provided an apparatus for authenticating sheets, characterized by transport means for feeding sheets individually past ultra-violet (UV) light source means, UV light sensing means for sensing fluorescence from a sheet irradiated with UV light from said light source means, and detecting means for detecting when an output of said sensing means exceeds in one sense a pre-set reference value.

BRIEF DESCRIPTION OF THE DRAWINGS

One embodiment of the present invention will now be described by way of example with reference to the accompanying drawings in which.

DETAILED DESCRIPTION

Figure 1:
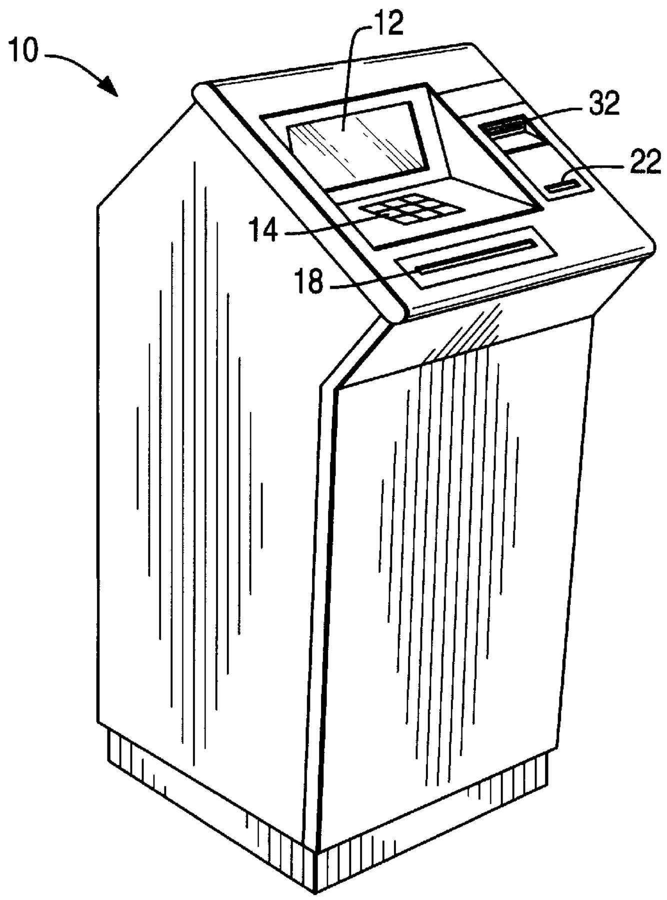
FIG. 1 is a perspective view of a self-service deposit terminal.
Figure 2:
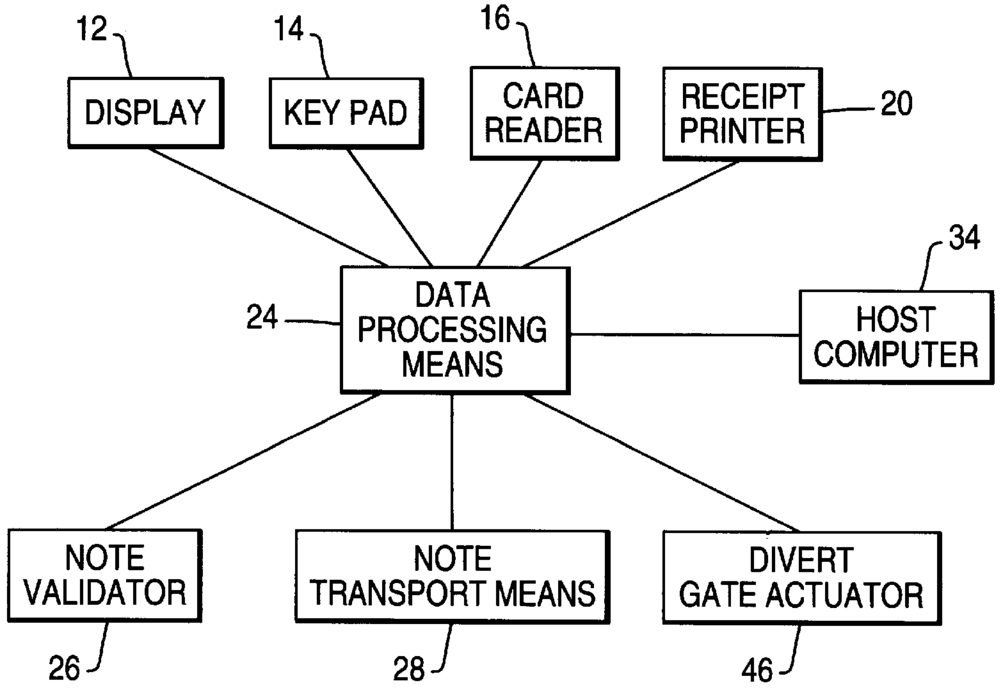
FIG. 2 is a block diagram of the deposit terminal of FIG. 1.

Referring to FIGS. 1 and 2, the self-service deposit terminal 10 shown therein includes a display 12 for displaying user information, a key pad 14 for inputting data, a card reader 16 for receiving a user identity card, a deposit slot 18 in which bank notes can be deposited, a receipt printer 20 for printing a receipt acknowledging a deposit made by a user and for issuing the receipt to the user via a slot 22, and data processing means 24 to which the display 12, the key pad 14, the card reader 16 and the receipt printer 20 are connected. A note validator 26 (to be described in more detail later) and note transport means 28 are also connected to the data processing means 24, the transport means 28 serving to transport deposited notes along paths indicated by arrows 30 in FIG. 3 under the control of the data processing means 24.

To make a deposit, a user inserts his identification card in the card slot 32 of the terminal 10. Data contained in a magnetic strip on the card is read by the card reader 16 and transmitted by the data processing means 24 to a host computer 34. If the host computer 34 authorizes the card then the user can proceed with his deposit by first entering details of the transaction, e.g. the amount of the deposit, by means of the key pad 14, and then by depositing bank notes in the slot 18.

Figure 3:
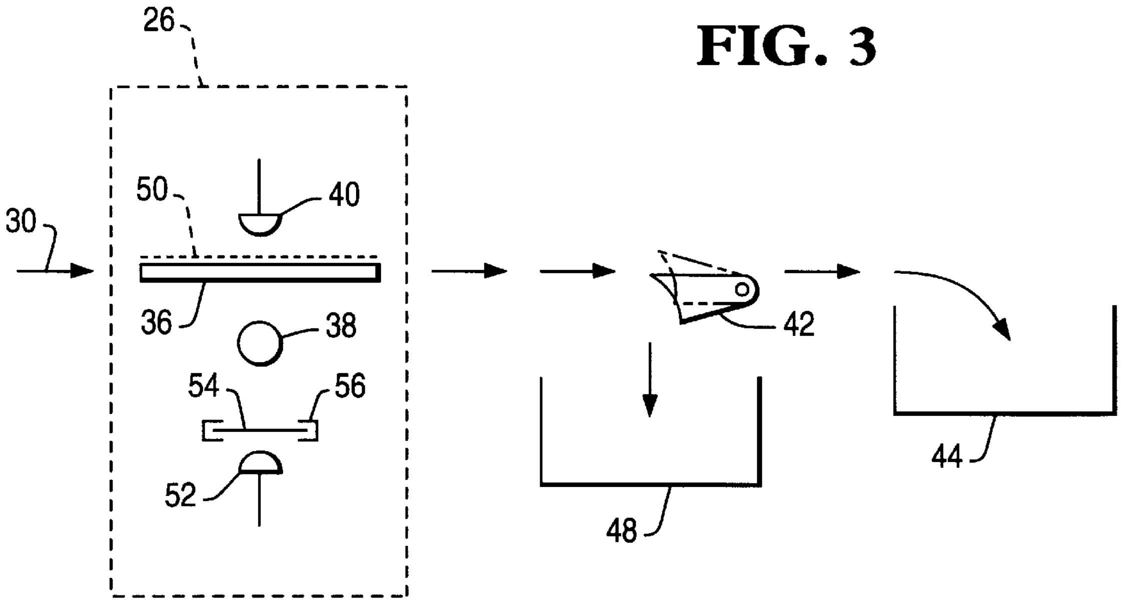
FIG. 3 is a schematic representation of a note validator according to the invention included in the terminal of FIG. 1.

Referring now to FIG. 3, the deposited notes are separated out by conventional means (not shown) and individually passed along a feed path (shown by arrow 30) by transport means 28 (see FIG. 2). The feed path 30 takes each note 36 through the note validator 26 inside which the note is passed between a UV light tube 38, which extends perpendicularly to the feed path 30, and a photo-diode 40.

Forged notes made from wood-based paper fluoresce when exposed to UV light, and so the output from the photo-diode 40 is used to indicate whether the note 36 is valid. If a note is accepted as valid by the validator 26 then a divert gate 42 remains in its home position shown in solid outline and the note is fed to collection means 44. If a note is rejected as invalid by the validator 26, then the data processing means 24 rotates the divert gate 42 into the position shown in chain outline by means of an actuator 46 (see FIG. 2), and the note is fed to a rejection bin 48.

To prevent UV light from falsely triggering the note validator 26 when no note is passing the UV tube 38, a UV filter 50 is placed between the feed path 30 and the photo-diode 40.

The level of light emitted by the UV light tube 38 varies and ultimately decreases over time. This level of light is monitored by a second photo-diode 52. A piece of wood-based paper 54 is held in a supporting frame 56 positioned between the diode 52 and the tube 38, so that the diode 52 detects fluorescence. As the output of UV light from the tube 38 varies so does the level of fluorescence detected by the diode 52.

Figure 4:
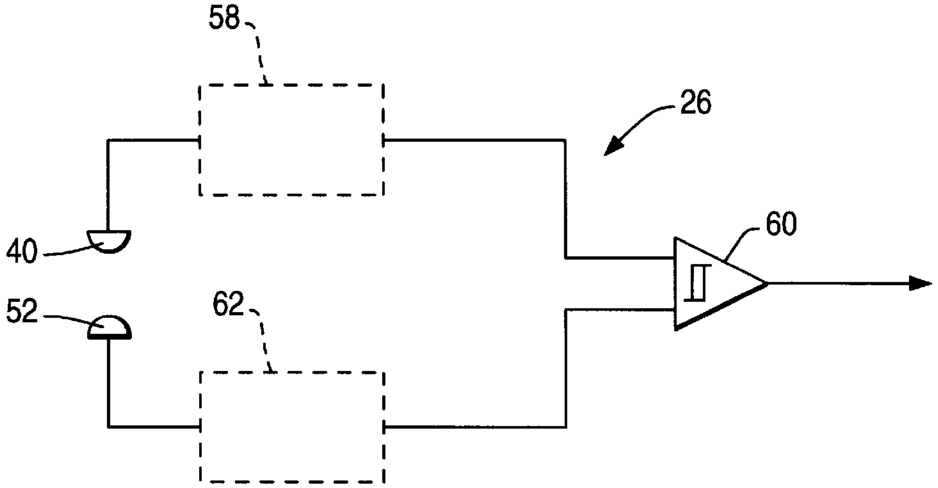
FIG. 4 is a schematic representation of the circuitry for the note validator.

Referring to FIG. 4, the first photo-diode 40 is connected via an amplifying and resistance circuit 58 to a Schmitt trigger 60. The second photo-diode 52 is also connected via an amplifying and resistance circuit 62 to the Schmitt trigger 60. The output from the Schmitt trigger 60 is fed into the data processing means 24 (see FIG. 2).

The amplified signal from the second photo-diode 52, used for monitoring the level of light emitted by the UV light tube 38, acts as a threshold value. By adjusting the resistances in the amplifying and resistance circuit 62, a very precise threshold can be initially set which is sensitive enough to detect good forgeries such as when notes have been covered with a non-fluorescent coating. The resistances in both amplifying and resistance circuits 58,62 are set so that the input into the Schmitt trigger 60 from the first photo-diode 40 is higher than the input from the second photo-diode 52 if a significant amount of fluorescence, indicative of a forged note using wood-based paper, is detected when a note passes the UV light tube 38. Thus, the output of the Schmitt trigger 60 goes high when fluorescence is detected indicating that the note is invalid. Otherwise, the output remains low indicating validity.

Figure 5:
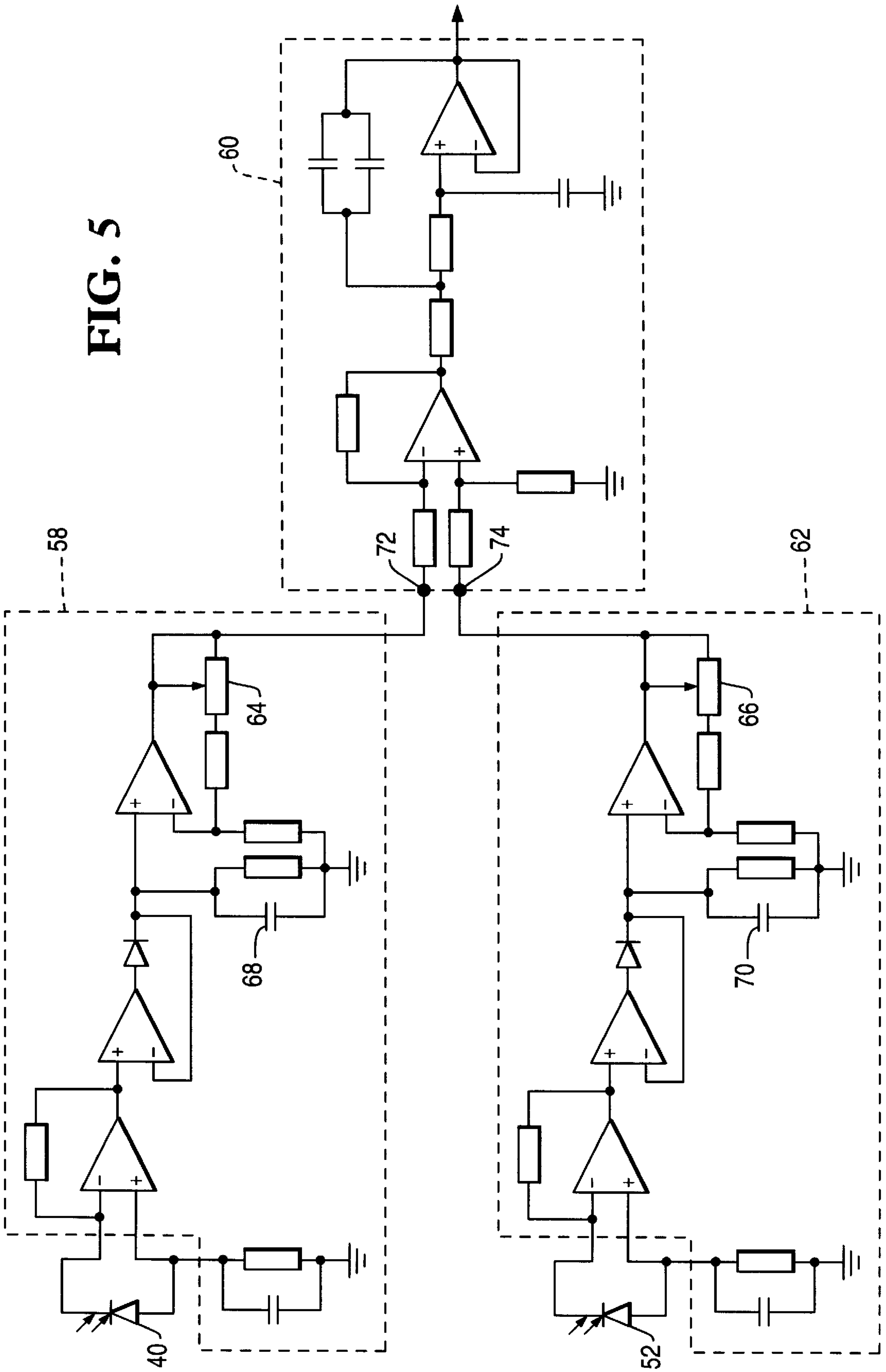
FIG. 5 is a circuit diagram of FIG. 4.

Referring to FIG. 5, a circuit diagram comprising the photo-diodes 40,52, the amplifying and resistance circuits 58,62 and the Schmitt trigger 60 is shown. The setting of the threshold used for triggering the Schmitt trigger 60 can be adjusted by adjustment of variable resistors 64 and 66 respectively provided in the amplifying and resistance circuits 58 and 62.

The peak value of the output of photo-diode 40 during the passage of a note past the UV light tube 38 is temporarily stored in a capacitor 68 provided in the amplifying and resistance circuit 58. The output of photo-diode 52 that monitors the UV light tube 38 is stored in capacitor 70 provided in the amplifying and resistance circuit 62. As the output of the tube 38 ultimately decreases over time so would the value stored in the capacitor 70. If at any time during the passage of a note past the UV light tube 38 the voltage at the output terminal 72 of the amplifying and resistance circuit 58 goes higher than the voltage at the output of terminal 74 of the amplifying and resistance circuit 62, then the output of the Schmitt trigger 60 goes high, thereby indicating that an invalid note has been detected.

The authentication apparatus described above can be used to detect forged notes in any automated currency handling system. It is envisaged that the apparatus would be used as a secondary validation system to work alongside some other validation system. Thus, the notes could also be passed through additional validation means (not shown) connected to the data processing means 24. If the output of the additional validation means and the Schmitt trigger 60 indicates that a particular note is a forgery, then the note is diverted into the reject bin 48.

An alternative to feeding in bank notes by hand is for them to be picked by conventional pick means from currency cassettes and then to be individually fed automatically through the authentication apparatus.

What is claimed is:

1. An apparatus for authenticating a sheet, the apparatus comprising:

a light source for irradiating the sheet with ultra violet light;

a first sensing unit for (i) sensing fluorescence of the sheet when irradiated with ultra violet light, and (ii) generating a signal indicative of the fluorescence of the sheet when irradiated with ultra violet light;

a detection unit for generating a signal indicative of authenticity of the sheet based upon the signal of the first sensor unit, and said detection unit (i) determines when the signal of the first sensing unit attains a predetermined threshold value, and (ii) generates the signal indicative of the authenticity of the sheet when the signal of the first sensing unit attains the predetermined threshold value; and a second sensing unit for (i) monitoring ultra violet light level of the light source, and (ii) generating a signal used as the predetermined threshold value based upon the ultra violet light level of the light source.

2. An apparatus according to claim 1, further comprising a fluorescence device positioned between the second sensing unit and the light source and for generating a threshold fluorescence value which is used by the second sensing unit to generate the signal used as the predetermined threshold value.

3. An apparatus according to claim 2, wherein the fluorescence device includes a sheet of wood-based paper.

4. An apparatus according to claim 1, wherein the detection unit includes a Schmitt trigger having (i) a first input for receiving the signal indicative of the fluorescence of the sheet, (ii) a second input for receiving the signal indicative of the predetermined threshold value, and (iii) an output for providing the signal indicative of the authenticity of the sheet when the fluorescence of the sheet attains the predetermined threshold value.

5. An apparatus according to claim 1, further comprising an ultra violet filter positioned between the light source and the first sensing unit and for attenuating extraneous ultra violet light radiating from the light source.

6. An apparatus according to claim 1, further comprising:

a divert unit for diverting the sheet when the detection unit generates the signal indicative of the authenticity of the sheet;

a collection unit for receiving the sheet if the fluorescence of the sheet fails to attain the predetermined threshold value which is indicative of the sheet being an authentic sheet; and a rejection unit for receiving the sheet if the fluorescence of the sheet attains the predetermined threshold value which is indicative of the sheet being a forged sheet.

7. An automated teller machine (ATM), the ATM comprising:

means defining a slot for receiving a banknote inserted therethrough;

a transport unit for transporting the banknote inserted through the slot;

a light source for irradiating the banknote with ultra violet when the transport unit transports the banknote;

a first sensing unit for (i) sensing fluorescence of the banknote when irradiated with ultra violet light, and (ii) generating a signal indicative of the fluorescence of the banknote when irradiated with ultra violet light;

a detection unit for generating a signal indicative of authenticity of the banknote based upon the signal of the first sensor unit, and said detection unit (i) determines when the signal of the first sensing unit attains a predetermined threshold value, and (ii) generates the signal indicative of the authenticity of the sheet when the signal of the first sensing unit attains the predetermined threshold value; and a second sensing unit for (i) monitoring ultra violet light level of the light source, and (ii) generating a signal used as the predetermined threshold value based upon the ultra violet light level of the light source.

8. An ATM according to claim 7, further comprising a fluorescence device positioned between the second sensing unit and the light source and for generating a threshold fluorescence value which is used by the second sensing unit to generate the signal used as the predetermined threshold value.

9. An ATM according to claim 8, wherein the fluorescence device includes a banknote of wood-based paper.

10. An ATM according to claim 7, wherein the detection unit includes a Schmitt trigger having (i) a first input for receiving the signal indicative of the fluorescence of the banknote, (ii) a second input for receiving the signal indicative of the predetermined threshold value, and (iii) an output for providing the signal indicative of the authenticity of the banknote when the fluorescence of the banknote attains the predetermined threshold value.

11. An ATM according to claim 7, further comprising an ultra violet filter positioned between the light source and the first sensing unit and for attenuating extraneous ultra violet light radiating from the light source.

12. An ATM according to claim 7, further comprising:

a divert unit for diverting the banknote when the detection unit generates the signal indicative of the authenticity of the banknote;

a collection unit for receiving the banknote if the fluorescence of the banknote fails to attain the predetermined threshold value which is indicative of the banknote being an authentic banknote; and a rejection unit for receiving the banknotes if the fluorescence of the banknote attains the predetermined threshold value which is indicative of the banknote being a forged banknote.

13. A method of authenticating a sheet, the method comprising the steps of:

(a) irradiating the sheet with ultra violet light;

(b) sensing fluorescence of the sheet when irradiated with ultra violet light;

(c) generating a signal indicative of the fluorescence of the sheet when irradiated with ultra violet light;

(d) generating a signal indicative of authenticity of the sheet based upon the signal indicative of the fluorescence of the sheet when irradiated with ultra violet light, and including the additional steps of:
(d-1) determining when the signal indicative of the fluorescence of the sheet attains a predetermined threshold value; and
(d-2) generating the signal indicative of the authenticity of the sheet when the signal indicative of the fluorescence of the sheet attains the predetermined threshold value;
(e) monitoring level of the ultra violet light irradiating said sheet; and
(f) generating a signal used as the predetermined threshold value based upon the level of the monitored ultra violet light.

14. A method according to claim 13, further comprising the steps of:
(g) collecting the sheet if the fluorescence of the sheet fails to attain the predetermined threshold value which is indicative of the sheet being an authentic sheet; and
(h) rejecting the sheet if the fluorescence of the sheet attains the predetermined threshold value which is indicative of the sheet being a forged sheet.

15. A banknote authenticator comprising:
means for irradiating said banknote with ultraviolet light;
means for detecting fluorescence from said irradiated banknote;
means for monitoring level of said irradiated light from said irradiating means and setting a threshold corresponding thereto; and
means for comparing said detected fluorescence with said set threshold for authenticating said banknote.

16. An authenticator according to claim 15 wherein said monitoring means are effective for varying said threshold as said ultraviolet light level varies.

17. An authenticator according to claim 16 wherein said monitoring means are further effective for detecting fluorescence in a threshold paper irradiated by said ultraviolet light for setting said threshold corresponding with said detected fluorescence for authenticating said banknote irradiated also by said ultraviolet light.

18. An authenticator according to claim 17 wherein:
said irradiating means include an ultraviolet light source;
said detecting means include a first photo-detector;
said monitoring means further include a second photo-detector; and
said comparing means include a Schmitt trigger operatively joined to both said first and second photo-detectors to produce an authentication signal when said detected fluorescence exceeds said monitored threshold.

19. An authenticator according to claim 18 wherein said first and second photo-detectors are disposed on opposite sides of said light source.

20. An authenticator according to claim 19 wherein said threshold paper is disposed between said light source and said second photo-detector.

* * * * *